(12) United States Patent
Oliver

(10) Patent No.: US 7,721,484 B2
(45) Date of Patent: May 25, 2010

(54) RODENT KILLING DEVICE

(76) Inventor: David Oliver, 621 W. Hoffman St., Baltimore, MD (US) 21201

( * ) Notice: Subject to any disclaimer, the term of this patent is extended or adjusted under 35 U.S.C. 154(b) by 100 days.

(21) Appl. No.: 12/017,099

(22) Filed: Jan. 21, 2008

(65) Prior Publication Data

US 2008/0196295 A1 Aug. 21, 2008

Related U.S. Application Data

(60) Provisional application No. 60/902,072, filed on Feb. 20, 2007.

(51) Int. Cl.
*A01M 19/00* (2006.01)
(52) U.S. Cl. .......................................................... 43/98
(58) Field of Classification Search ............... 43/98, 43/112
See application file for complete search history.

(56) References Cited

U.S. PATENT DOCUMENTS

| | | | | |
|---|---|---|---|---|
| 2,052,945 A | * | 9/1936 | Scott | 43/112 |
| 2,098,884 A | * | 11/1937 | Rousseau | 43/98 |
| 2,440,214 A | * | 4/1948 | Wilson | 43/98 |
| 2,951,310 A | * | 9/1960 | Anderson et al. | 43/112 |
| 3,346,988 A | * | 10/1967 | Pickering | 43/112 |
| 3,729,857 A | * | 5/1973 | Giordano | 43/112 |
| 3,894,351 A | * | 7/1975 | Iannini | 43/112 |
| 3,998,000 A | * | 12/1976 | Gilbert | 43/112 |
| 4,037,351 A | * | 7/1977 | Springer | 43/112 |
| 4,274,123 A | * | 6/1981 | Rogers, Jr. | 361/232 |
| 4,959,923 A | * | 10/1990 | Aiello et al. | 43/112 |
| 5,107,620 A | * | 4/1992 | Mahan | 43/112 |
| 5,269,091 A | * | 12/1993 | Johnson et al. | 43/98 |
| 5,949,636 A | | 9/1999 | Johnson et al. | |
| 7,219,466 B2 | | 5/2007 | Rich et al. | |
| 2006/0123693 A1 | | 6/2006 | Muller et al. | |

* cited by examiner

*Primary Examiner*—Thomas Price
(74) *Attorney, Agent, or Firm*—Dale J. Ream

(57) ABSTRACT

A rodent killing trap includes a case having front and rear sides. A plurality of electrodes are operatively coupled to the case and exposed adjacent the case front and rear sides so as to electrocute a rodent upon contact. The rodent killing trap may be connected to an electrical power source and includes a switch for selectively actuating the plurality of electrodes by electrical connection to the power source. The device may only be activated or deactivated using a tool or implement so as to be safe from use by children.

2 Claims, 3 Drawing Sheets

US 7,721,484 B2

RODENT KILLING DEVICE

REFERENCE TO RELATED APPLICATIONS

This application claims the benefit of a U.S. Provisional Patent Application Ser. No. 60/902,072 filed Feb. 20, 2007, entitled Oliver's Rodent Killing Invention.

BACKGROUND OF THE INVENTION

This invention relates generally to rodent control devices and, more particularly, to a rodent killing device that terminates rodents such as mice and rats while itself being substantially indistinguishable from conventional wood baseboard trim boards.

Household rodents are unwanted, unsightly, and unsanitary not to mention inconvenient and destructive. Mice and rats are common but undesirable invaders of many residential dwellings. These rodents often enter a residential dwelling in search of food or shelter and are often difficult to completely eliminate.

Various devices have been proposed in the art to kill household pests such as mice and rats. Conventional devices for eradicating such rodents are traps and poison. Although assumably effective for their intended purposes, traps are often large, bulky, or otherwise unattractive in a residential setting. Other pest control devices, especially those that may use electricity, are not safe for humans without using an extraordinary amount of care. Further, existing devices may be unattractive when installed in a residential home environment.

Therefore, it would be desirable to have a rodent killing device that uses electricity to kill pests upon contact. Further, it would be desirable to have a rodent killing device that may only be activated or deactivated by an adult. In addition, it would be desirable to have a rodent killing device that is inconspicuous and appears to be a normal baseboard or trim fixture.

SUMMARY OF THE INVENTION

Accordingly, a rodent killing trap according to the present invention includes a case having front and rear sides. A plurality of electrodes are operatively coupled to the case and exposed adjacent the case front and rear sides so as to electrocute a rodent upon contact. The rodent killing trap may be connected to an electrical power source and includes a switch for selectively actuating the plurality of electrodes by electrical connection to the power source. The device may only be activated or deactivated using a tool or implement so as to be safe from use by children.

Therefore, a general object of the present invention is to provide a rodent killing device for terminating rodents such as mice or rats by electrocution upon contact with electrodes.

Another object of this invention is to provide a rodent killing device, as aforesaid, that is safe and that may only be activated or deactivated by a using a separate implement or tool.

Still another object of this invention is to provide a rodent killing device, as aforesaid, that is inconspicuous and indistinguishable from a traditional baseboard or trim fixture.

Yet another object of this invention is to provide a rodent killing device, as aforesaid, having a scent or other lure to attract rodents to come into contact with the device.

A further object of this invention is to provide a rodent killing device, as aforesaid, that is easy to use and cost effective to manufacture.

Other objects and advantages of the present invention will become apparent from the following description taken in connection with the accompanying drawings, wherein is set forth by way of illustration and example, embodiments of this invention.

BRIEF DESCRIPTION OF THE DRAWINGS

FIG. 1b is an isolated view on an enlarged scale taken from a portion of FIG. 1a;

FIG. 2 is an exploded view of the rodent killing trap as in FIG. 1a; and

DESCRIPTION OF THE PREFERRED EMBODIMENT

A rodent killing device according to the present invention will now be described in detail with reference to FIG. 1a through FIG. 3 of the accompanying drawings. More particularly, the rodent killing device 100 includes a case 110 and a plurality of electrodes 120.

Figure 2:
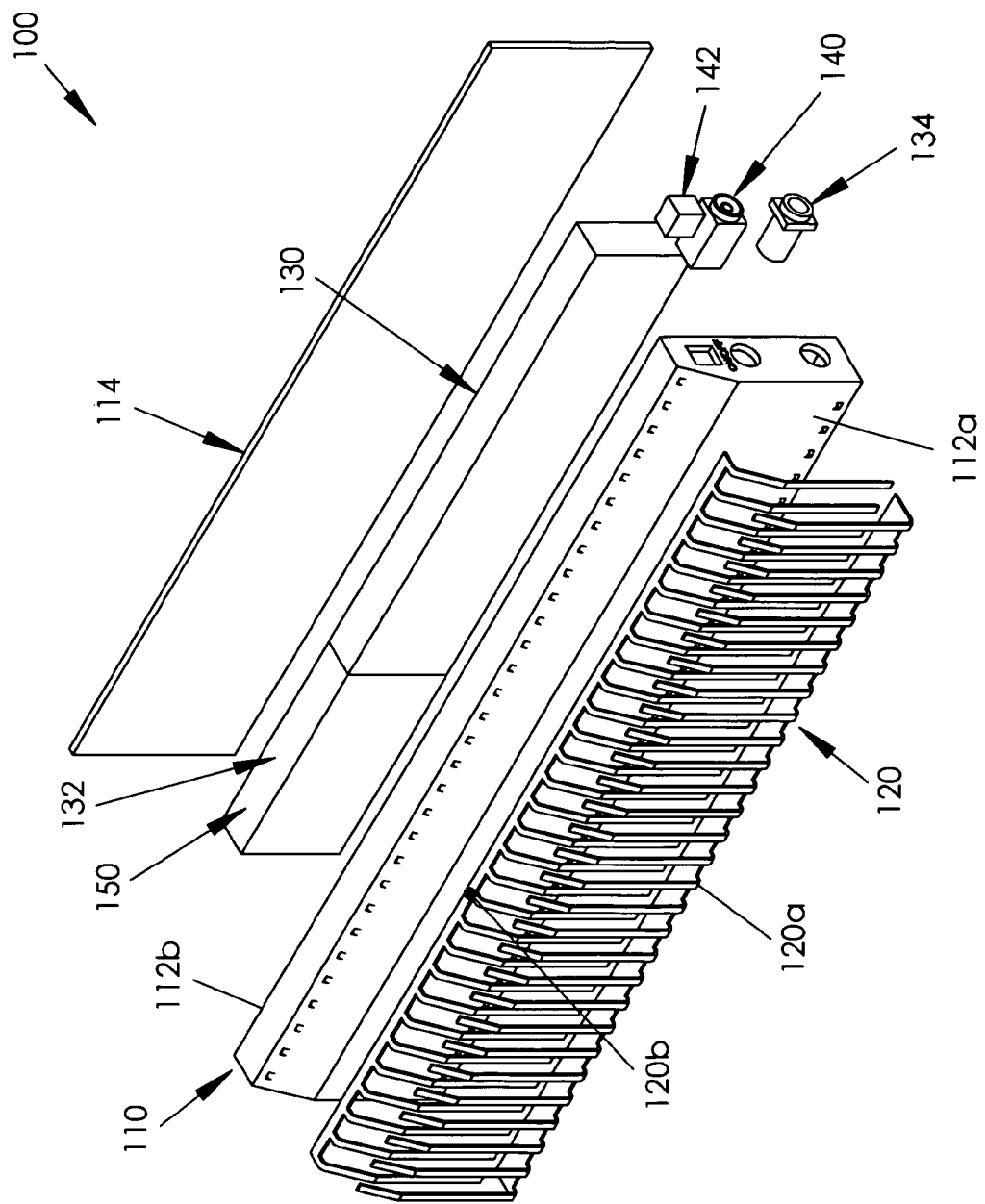

As shown in FIG. 2, the case 110 is elongate and has front and rear sides 112a, 112b. The rear side 112b may be generally planar and generally vertical for positioning against at least one of a wall and a baseboard. The rear side 112b may include adhesive 114 or any other appropriate fastener to join the case rear side 112b to at least one of the wall and the baseboard.

The plurality of electrodes 120 are operatively coupled to the case 110 and exposed adjacent the case front side 112a to electrocute a rodent. The electrodes 120 may have elongate configurations and be adjacent one another to allow two electrodes 120 to contact the rodent simultaneously and pass electrical current therebetween, closing an electrical circuit and electrocuting the rodent. FIG. 2 shows first and second electrodes 120a, 120b having interlocking configurations to allow the rodent to contact the rodent simultaneously and pass electrical current therebetween, closing an electrical circuit and electrocuting the rodent.

Figure 3:
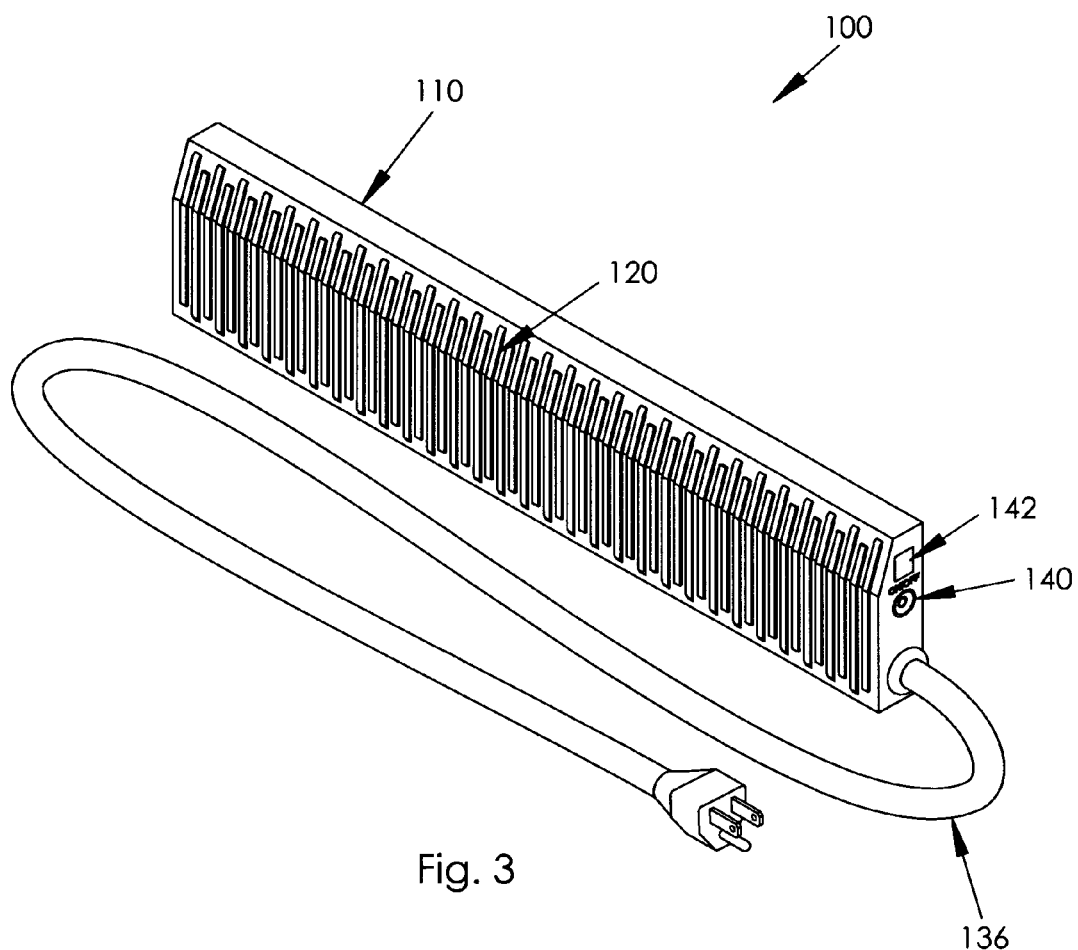
FIG. 3 is a perspective view of the rodent killing trap as in FIG. 1a adapted for use with an A/C power cable.

Means for powering the plurality of electrodes 120 are included. As shown in FIG. 2, a battery 130 may be housed in the case 110 to power the electrodes 120. A transformer 132 may be housed in the case 110 and be in electrical communication with the battery 130 and the electrodes 120 to alter electrical characteristics of output from the battery 130 to provide sufficient current to the plurality of electrodes 120 to electrocute the rodent. A recharging socket 134 may be in electrical communication with the battery 130 for electrically coupling the battery 130 to an alternating current power source (e.g., a standard 110-volt power outlet) to recharge the battery 130. Alternately or additionally, as shown in FIG. 3, the means for powering the electrodes 120 may include circuitry 136 for receiving power from an alternating current power source (e.g., a standard 110-volt power outlet).

Figure 1A:
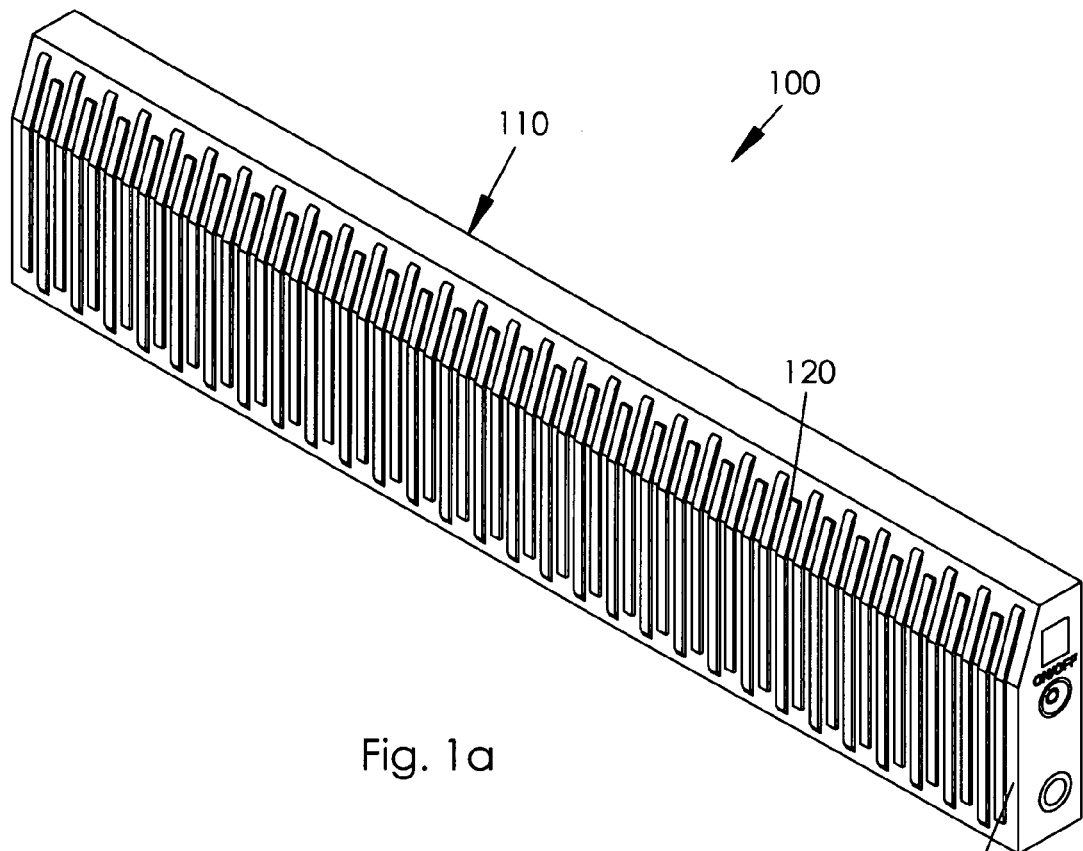
FIG. 1a is a perspective view of a rodent killing trap according to a preferred embodiment of the present invention.
Figure 1B:
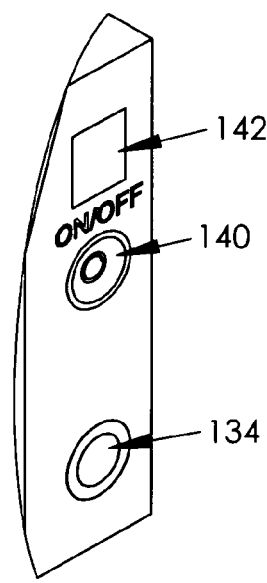

Returning to FIG. 1, a switch 140 may be included for selectively actuating the plurality of electrodes 120 with the means for powering discussed above. More particularly, the switch 140 may be in electrical communication with the battery 130 or the circuitry 136 to selectively actuate the plurality of electrodes 120. The switch 140 may be configured to require a tool for activating. As shown in FIG. 1, for example, the switch 140 may be a small recessed push button that requires a small pointed object for activation. An indicator 142 (e.g., a visual indicator, audible indicator, etc.) may be included to present an actuation status of the plurality of electrodes 120. In other words, the indicator 142 may be in electrical communication with the battery 130 or the circuitry 136 to show whether the electrodes 120 are actuated.

Circuitry 150 may be in electrical communication with the electrodes 120 to deactivate the electrodes 120 after the electrical circuit is closed (e.g., by the rodent) for a predetermined amount of time. Circuitry 150 is shown in combination with transformer 132 in FIG. 2, though circuitry 150 may be entirely separate from transformer 132.

In use, the case 110 is positioned as desired by the user. It may be preferable, for example, to position the case 110 against a wall or a baseboard, and the adhesive 114 at the case rear side 112b may be used to affix the case 110 to the wall, baseboard, etc. If the battery 130 is not included, the circuitry 136 may be plugged into a standard 110-volt power outlet. The switch 140 may be used to actuate the electrodes 120. Requiring a tool to be required to activate the switch 140 (as set forth above) may safeguard against the switch 140 being unintentionally activated. The indicator 142 may show whether the electrodes 120 are actuated, reducing accidental shock to the user. Once the electrodes 120 are actuated, a rodent (or any other object) touching the electrodes 120 may be electrocuted. A scented spray or other bait may be used to lure the rodent to the rodent killing device 100. Touching two electrodes 120 simultaneously may complete an electrical circuit, allowing the rodent (or other object) to be electrocuted. Touching only one electrode 120 may nevertheless electrocute the rodent, though the rodent must be grounded. As such, electrocution may be more certain if two electrodes 120 are touched simultaneously. The electrocution is sufficient to kill the rodent, which may then be discarded with minimal cleaning. To safeguard against a short circuit arising, the circuitry 150 may deactivate the electrodes 120 after the electrical circuit is closed for a predetermined amount of time.

It is understood that while certain forms of this invention have been illustrated and described, it is not limited thereto except insofar as such limitations are included in the following claims and allowable functional equivalents thereof.

The invention claimed is:

1. A rodent killing device, comprising:
   a case having front and rear sides, said case rear side being generally planar and generally vertical for positioning against at least one of a wall and a baseboard;
   wherein said case rear side includes adhesive to join said case rear side to at least one of said wall and said baseboard;
   a plurality of electrodes operatively coupled to said case and exposed adjacent said case front side to electrocute a rodent;
   wherein said plurality of electrodes includes a plurality of first electrodes and a plurality of second electrodes, each first electrode having a free end extending upwardly between adjacent second electrodes and each second electrode extending upwardly between adjacent first electrodes;
   means for powering said plurality of electrodes; and
   a switch configured for operation by a user to selectively actuate said plurality of electrodes with said means for powering, said switch being configured to require a tool for activating;
   circuitry to deactivate said electrodes after said electrical circuit is closed for a predetermined amount of time;
   a transformer to alter electrical characteristics of said means for powering to provide additional current to said plurality of electrodes; and
   wherein:
     said electrodes have elongate configurations;
     said plurality of electrodes have a parallel and interlocking configuration to allow two said electrodes to contact said rodent simultaneously and pass electrical current therebetween, whereby electrocuting said rodent; and
     said means for powering said plurality of electrodes includes at least one of a battery and circuitry for receiving power from an alternating current power source.

2. The rodent killing device of claim 1, further comprising an indicator to present an actuation status of said plurality of electrodes.

* * * * *